United States Patent
Cama et al.

(10) Patent No.: US 10,007,914 B2
(45) Date of Patent: *Jun. 26, 2018

(54) FRAUD DETECTION EMPLOYING PERSONALIZED FRAUD DETECTION RULES

(71) Applicant: INTERNATIONAL BUSINESS MACHINES CORPORATION, Armonk, NY (US)

(72) Inventors: Karl J. Cama, Coppell, TX (US); Daniel T. Harrison, Newmarket (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/398,330

(22) Filed: Jan. 4, 2017

(65) Prior Publication Data

US 2017/0116613 A1    Apr. 27, 2017

Related U.S. Application Data

(63) Continuation of application No. 13/743,520, filed on Jan. 17, 2013, now Pat. No. 9,569,779.

(51) Int. Cl.
*G06Q 40/00* (2012.01)
*G06Q 20/40* (2012.01)

(52) U.S. Cl.
CPC ....... *G06Q 20/4016* (2013.01); *G06Q 20/405* (2013.01)

(58) Field of Classification Search
CPC ...... G06Q 40/00; G06Q 20/10; G06Q 20/102; G06Q 20/382
See application file for complete search history.

(56) References Cited

U.S. PATENT DOCUMENTS

| | | |
|---|---|---|
| 7,636,696 B1 | 12/2009 | Sigler, Jr. |
| 8,078,515 B2 | 12/2011 | John |
| 8,229,852 B2 | 7/2012 | Carlson |
| 8,336,088 B2 | 12/2012 | Raj et al. |
| 8,452,267 B2 | 5/2013 | Friman |
| 8,612,350 B2 | 12/2013 | Lee |
| 8,618,913 B1 | 12/2013 | Bailey et al. |
| 2004/0044627 A1 | 3/2004 | Russell et al. |
| 2008/0027844 A1 | 1/2008 | Little et al. |
| 2008/0033880 A1 | 2/2008 | Fiebiger et al. |

(Continued)

OTHER PUBLICATIONS

Office Action in U.S. Appl. No. 13/743,520, filed Sep. 24, 2013, 14 pgs.

(Continued)

*Primary Examiner* — Lalita M Hamilton
(74) *Attorney, Agent, or Firm* — Joseph Petrokaitis; Matthew M. Hulihan; Heslin Rothenberg Farley & Mesiti PC (57) ABSTRACT

Detection of fraud in financial transactions is facilitated. A financial transaction is initiated by a user, and based on the financial transaction, information is obtained by an electronic device of the user. Using the information, the electronic device evaluates a set of rules personalized for the user; the set of rules to be used to determine whether the financial transaction is to be approved for the user. The electronic device provides an initial indication, based on the evaluating, of whether the financial transaction is to be approved.

20 Claims, 5 Drawing Sheets

(56) References Cited

U.S. PATENT DOCUMENTS

| | | |
|---|---|---|
| 2008/0109392 A1 | 5/2008 | Nandy |
| 2008/0288405 A1 | 11/2008 | John |
| 2008/0313047 A1 | 12/2008 | Casares et al. |
| 2009/0132392 A1 | 5/2009 | Davis et al. |
| 2009/0132813 A1 | 5/2009 | Schibuk |
| 2009/0216681 A1 | 8/2009 | McCown |
| 2009/0254476 A1 | 10/2009 | Sharma et al. |
| 2010/0169182 A1 | 7/2010 | Madani |
| 2010/0223193 A1 | 9/2010 | Weiner et al. |
| 2010/0248779 A1 | 9/2010 | Phillips et al. |
| 2011/0022472 A1 | 1/2011 | Zon |
| 2011/0047628 A1 | 2/2011 | Viars |
| 2012/0143722 A1 | 6/2012 | John |
| 2012/0215688 A1 | 8/2012 | Musser et al. |
| 2012/0259784 A1 | 10/2012 | Carlson et al. |
| 2012/0295580 A1 | 11/2012 | Corner |
| 2013/0018791 A1 | 1/2013 | Mendicino et al. |
| 2013/0041821 A1 | 2/2013 | Kingston et al. |
| 2013/0102283 A1 | 4/2013 | Lau et al. |
| 2013/0238499 A1 | 9/2013 | Hammad |
| 2013/0311382 A1 | 11/2013 | Fosmark |
| 2014/0201077 A1 | 7/2014 | Cama et al. |

OTHER PUBLICATIONS

Final Office Action in U.S. Appl. No. 13/743,520, filed Apr. 8, 2014, 21 pgs.

Office Action in U.S. Appl. No. 13/743,520, filed Nov. 6, 2014, 13 pgs.

Final Office Action in U.S. Appl. No. 13/743,520, filed May 20, 2015, 14 pgs.

Office Action in U.S. Appl. No. 13/743,520, filed Dec. 16, 2015, 9 pgs.

Final Office Action in U.S. Appl. No. 13/743,520, filed Jul. 11, 2016, 9 pgs.

Notice of Allowance in U.S. Appl. No. 13/743,520, filed Oct. 3, 2016, 8 pgs.

FRAUD DETECTION EMPLOYING PERSONALIZED FRAUD DETECTION RULES

BACKGROUND

Many types of financial transactions have risks associated therewith, including risks of fraud. For instance, a financial transaction that involves the use of a credit card to pay for particular goods or services runs the risk that the credit card being used is unauthorized. When the credit card is used, an authorization process is performed by, for instance, the financial institution or other processing center that issued the credit card to determine if the use is authorized. If the use is authorized, the financial transaction successfully completes. Otherwise, the transaction fails.

The authorization process, however, is not perfect. Payment may be approved even if use of the card is unauthorized. Therefore, financial institutions are constantly enhancing their ability to detect fraud. They are deploying ever increasingly sophisticated computer techniques and complex fraud detection rule sets to detect fraud.

BRIEF SUMMARY

Shortcomings of the prior art are overcome and additional advantages are provided through the provision of a method of facilitating fraud detection. The method includes, for instance, obtaining, by an electronic device of a user, based on a financial transaction of the user, information relating to the financial transaction; evaluating, by the electronic device using the obtained information, a set of rules personalized for the user, the set of rules to be used to determine whether the financial transaction is to be approved for the user; and providing by the electronic device, based on the evaluating, an initial indication of whether the financial transaction is to be approved.

Systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In an effort to detect fraud in financial transactions, financial transaction processing centers (referred to herein as processing centers), such as financial institutions (e.g., banks, other lenders, etc.), merchants, etc., use fraud detection rule sets and complex fraud detection techniques. A rule set includes one or more rules used to determine the likelihood that a particular financial transaction is fraudulent. For instance, a rule may state: Is this purchase outside the norm of purchases associated with this credit card (e.g., not in a normal locale for the purchaser . . . in another state, country; higher cost than typical, etc.)? This is only one example. There are many other possible rules and other possible types of rules. Many of these rules are not unique to a particular user, but, instead, the same rules are used for all or many of the users. For instance, for each credit card purchase, regardless of user, the rule checks whether the purchase is within the norm of purchases for the credit card.

These rules are evaluated by the fraud detection techniques, and based on the evaluation, an indication is provided as to whether the financial transaction is fraudulent. The rule sets and detection techniques are processed by computers of the processing centers in an effort to detect fraud, and therefore, are considered herein as server-based rule sets that are processed by the computers (or processors) of the processing centers. Although rule sets and complex techniques are used, the processing centers are unable to deploy and manage fraud detection rules that are unique and custom to each user (e.g., customer) they serve. They possess neither the compute power nor the resources to effectively manage and deploy fraud rules that can change (even on a moment's notice) based on the needs of the users they serve.

Thus, in accordance with one aspect, the processing power within a user's own electronic device, such as a smart device, and the increasing speed of the communication network are utilized to allow users the ability to extend and personalize fraud detection rules. These personalized fraud detection rules are under the control of the user (or under the control of a person on behalf of the user; e.g., a parent for a child; a child for an elderly parent; a guardian for a person; etc.) and are not shared with the processing center. Thus, they can be changed at will by the user (or another on behalf of the user) and remain private and confidential to the user (or by another on behalf of the user). This approach allows a processing center to request the validation of a specific purchase based on personalized, customized rules available to the electronic device, while allowing control by the user or on behalf of the user over the dissemination of personal information. This approach is, for instance, a voluntary approach that co-exists and extends, at the discretion of the user or a person on behalf of the user, the server-based fraud detection rules and procedures performed by the processing center.

As used herein, the set of rules personalized for the user (a.k.a., personalized set of rules; private set of rules; custom set of rules; personal rules; etc.) includes one or more rules and/or personalized information available to the electronic device. That is, the personalized set of rules may include one or more rules; one or more rules and personalized information; or just personalized information used to determine if a particular financial transaction is fraudulent. In one embodiment, the personalized set of rules just includes one or more rules, and the personalized information is separate therefrom. However, in other embodiments, the set of rules includes one or more rules and the personalized information, or just the personalized information.

In accordance with one aspect, a capability is provided that allows individuals to extend and personalize the set of fraud detection rules provided by their processing center while controlling the amount of personal information that is released. This includes, for instance, a series of rules to evaluate the fraud probability of a purchase by drawing on the relationship between the purchase and information available to the user's electronic device. The details relating to a transaction are sent to one or more of a user's registered devices, as described herein. Each device processes the transaction details based on personal rules that are controlled by or on behalf of the user and/or information available to the user's device.

As used herein, the phrase "an electronic device of a user," "a user's electronic device" or similar phrases refer to the user's own electronic device and/or one or more electronic devices associated with the user, such as, for instance, a family member's or guardian's device. It includes, for instance, those devices for which the user has some control over and/or some connection with. In one example, any electronic device indicated by the user or on behalf of the user to be contacted is considered an electronic device of the user or the user's electronic device.

In one embodiment, a user's electronic device can be any type of device capable of receiving requests from a processing center, performing processing based on the requests, and providing results based on the performing. Such devices include, but are not limited to, smart devices (e.g., an electronic device that is cordless, unless being charged, mobile, connected (via, e.g., WiFi, 3G, 4G, etc.) and is capable of voice communication, video communication and/or internet browsing . . . e.g., smart phones, such as the Apple iPhone, an Android phone, or a phone using the Microsoft Windows operating system, as examples; tablets, such as the Apple iPad, the Microsoft Surface, a Dell tablet, as examples; etc.); personal computers; smart vehicles; etc. One example of such a device is described with reference to FIG. 1.

Figure 1:
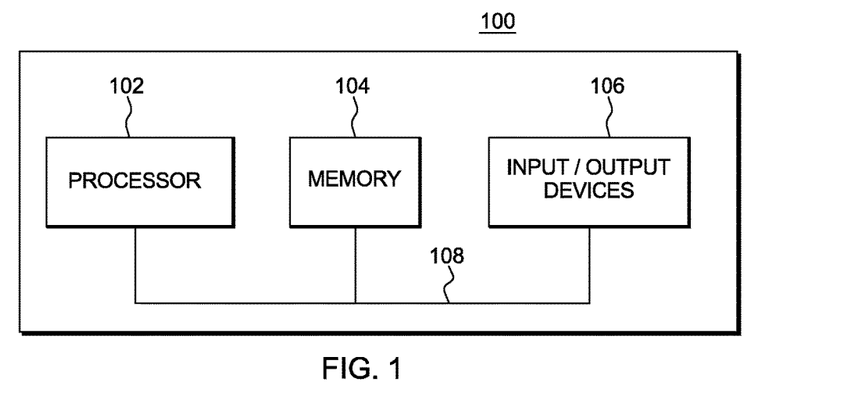
FIG. 1 depicts one embodiment of an electronic device to incorporate and/or use one or more aspects.

Referring to FIG. 1, in one example, an electronic device 100 includes a processor 102, such as a central processing unit (CPU), memory 104, and one or more input/output (I/O) components and/or devices 106, coupled to one another via, for example, one or more buses 108 or other communication links.

Processor 102 can be one of many types of processors provided by any number of manufacturers, including, for instance, International Business Machines Corporation (IBM), Intel Corporation, ARM Holdings, Advanced Micro Devices, Inc. (AMD), Apple Inc., Samsung, etc. Particular processors include POWER processors offered by International Business Machines Corporation; x86 processors offered by Intel Corporation; ARM-Cortex-A9 processors offered by ARM Holdings; A-series processors (e.g., A4, A5, A6) offered by Apple Inc.; as well as many more. (IBM is a registered trademark of International Business Machines Corporation, Armonk, N.Y. Other names used herein may be registered trademarks, trademarks or product names of International Business Machines Corporation or other companies.)

Memory 104 may include any type of memory, including but not limited to, various types of random access memory (RAM), including, but not limited to, DRAM (dynamic random access memory) and SRAM (static random access memory); read-only memory (ROM); erasable programmable read-only memory (EPROM); electrically erasable programmable read-only memory (EEPROM); flash memory, etc. The memory may be internal to the computer or provided by external means, such as a disk, flash drive, or other means.

In one embodiment, an electronic device processes details of a financial transaction based on personal rules that are controlled by or on behalf of a user and available to the electronic device (e.g., stored in memory), as well as personal information available to the user's device. As indicated above, the personal information may be a part of the rules or separate therefrom. Specific examples of available information include, for instance:

The browser history on a tablet or personal computer showing interest in buying an expensive television of the similar make/model.

The calendar entries for travel plans to Mexico in the user's smart phone allows for larger purchases in the visited areas.

The maximum amount spent in a month could be limited (lower than the financial institution's maximum) based on personal desire to control spending.

During an on-line purchase the "ship to" address must normally match the billing address on a credit card; however, if the "ship to" address matched an address in the smart device's address book the purchase is allowed.

An out of character purchase of an expensive piece of art (perfume, liquor, etc.) would be allowed based on a Facebook connection to a birthday party where the associated "wish list" of presents contained the same article.

A smart vehicle that identifies its gas tank has just been filled would be able to confirm a gas station purchase, etc.

To evaluate the personalized rules, the user's electronic device is registered with the processing center and an "app" (application) is installed on the electronic device, as further described below. The app is provided with access to the personal information and a network. The app, once registered, is given access, controlled by the user's privacy rules, to track personalized information for the user, such as the user's browser history, the user's address book, the user's local or web based calendar, the user's email and/or special details, like a vehicle's status (oil, gas, usage), etc. The app then monitors for inquiries from the processing center and compares transaction details to the gathered and/or available personalized information using rules and custom settings defined by or on behalf of the user. In one example, these rules come pre-packaged with the app allowing for instant usage; however, it is also possible for the user or third parties to develop, using the app, their own set of rules, which are stored on or otherwise made available to the electronic device.

In one embodiment, a user (or a person on behalf of the user) may register one or more electronic devices with a processing center (or multiple processing centers, such as each bank or merchant that has issued the user a credit card). For instance, a hierarchy of electronic devices may be registered with a processing center, in which a first device, such as a smart phone, is initially contacted. If that device is unavailable (e.g., shut off), then a second device, such as a tablet is contacted, and if that device is unavailable, then a home or office personal computer is contacted, and so forth.

Further, the electronic device that is registered may not necessarily by the user's own device, but one that has been designated by or on behalf of the user to be contacted, such as the user's own device(s), a spouse's device(s), a child's device(s), a guardian's device(s), etc.

In a further example, multiple electronic devices are contacted in parallel or concurrently, such as a child's smart phone and a parent's smart phone. In this scenario, each device returns an indication as to whether the financial transaction is to be approved. The processing center receives these indications and makes a final determination, based on logic, whether or not to approve the financial transaction.

In yet a further example, there is a hierarchy of devices, as well as concurrently contacted user's electronic devices. For instance, a child's and parent's smart phones are contacted concurrently, but if the parent's smart phone is unavailable, then a next device in a hierarchy of devices is contacted, and so forth.

Many other examples are possible. The examples provided herein for the hierarchy and/or concurrent processing are just examples. Many variations are possible.

Due to the required/desired speed of approving the financial transaction, the business logic for detecting fraud is automated, in one embodiment, and does not require the user of the electronic device to confirm the transaction. The electronic device is able to apply the appropriate rules based on the local information and return an indication related to the transaction specifying whether the transaction is valid. In one embodiment, the indication includes a confidence or fraud probability that indicates the probability that the transaction is fraudulent. The processing center compiles these fraud probabilities from one or more electronic devices in its fraud prevention process, and uses them to approve or deny the transaction, or to flag an account as at risk and to contact the user to verify if an account has been compromised.

Further details regarding one or more aspects are described with reference to FIGS. 2A-2C. In the examples described below, one electronic device is used to facilitate the financial transaction and that device is a smart device (e.g., a smart phone); however, aspects of the embodiment are not limited to such a device and/or to just one device. Further, in the example described below, the processing center is a financial institution, such as a bank or lender. However, in other embodiments, it can be other entities, such as a merchant offering a credit card or other financial services, or other types of entities.

Figure 2A:
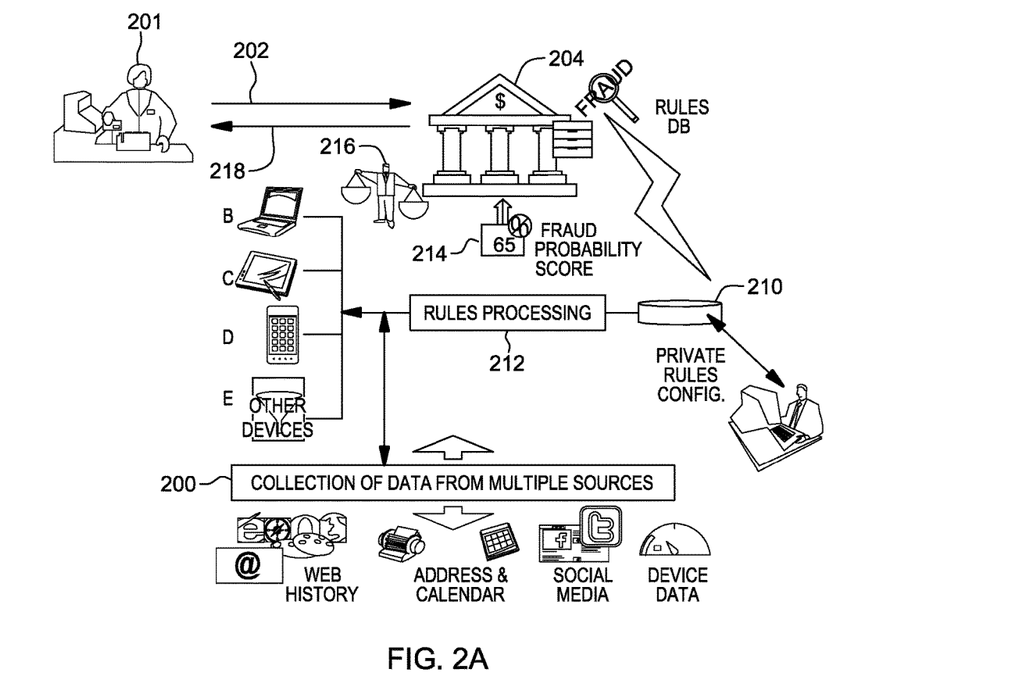
FIG. 2A pictorially depicts one embodiment of a fraud detection process in accordance with one or more aspects.

Referring to FIG. 2A, initially, registration of the electronic device and loading of the app is performed. For instance, a user or a person on behalf of the user registers a smart device to be contacted with the financial institution (or other processing center) that is to perform the contacting in order to create a secure id that is used by the smart device to communicate with the financial institution. As shown in STEPs B, C, D, any electronic device with a network or data connection that can provide feedback can be registered with the financial institution. Further details regarding registration are described with reference to FIG. 2C.

Figure 2B:
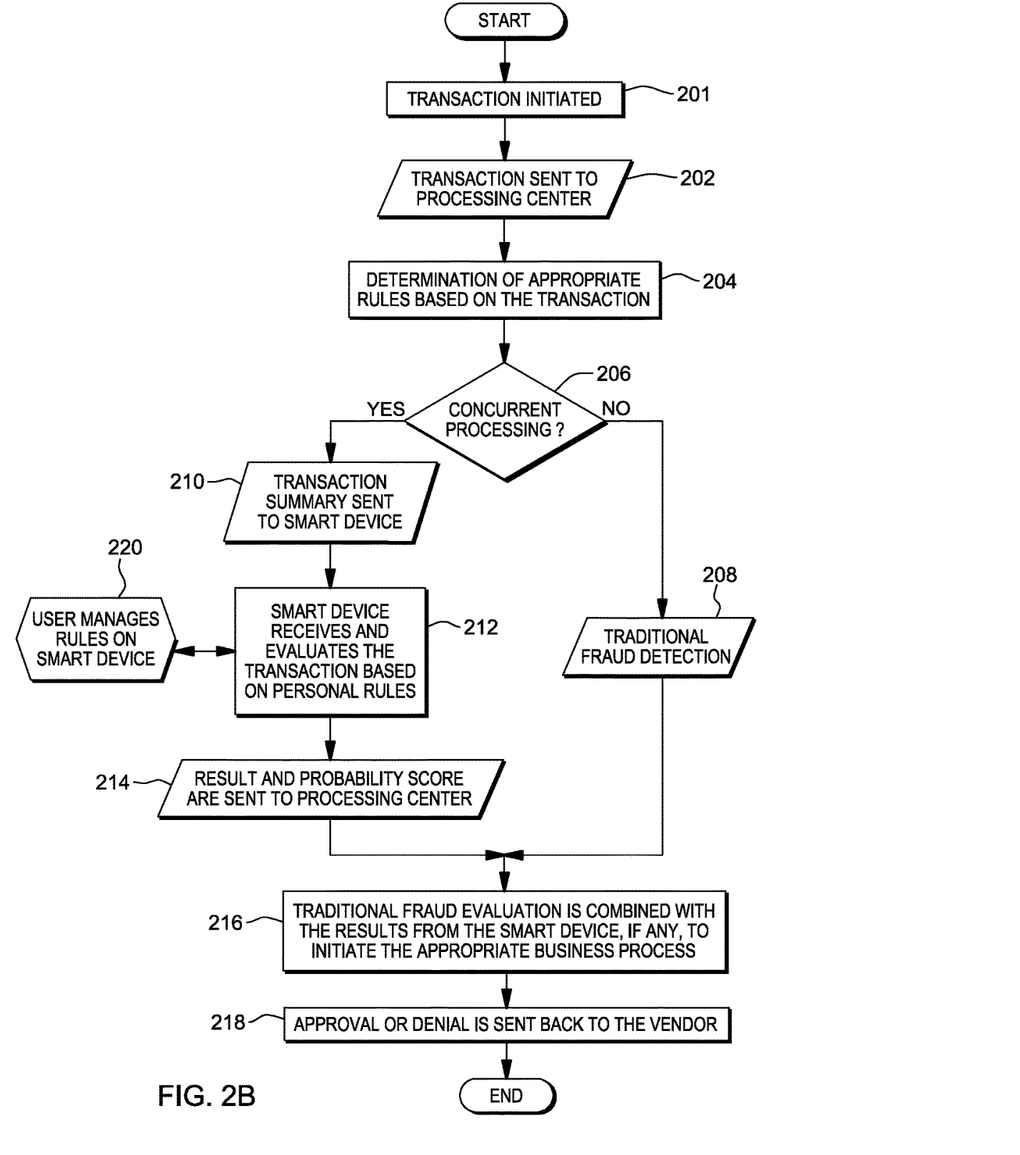
FIG. 2B depicts one embodiment of the logic to detect fraud, in accordance with one or more aspects.
Figure 2C:
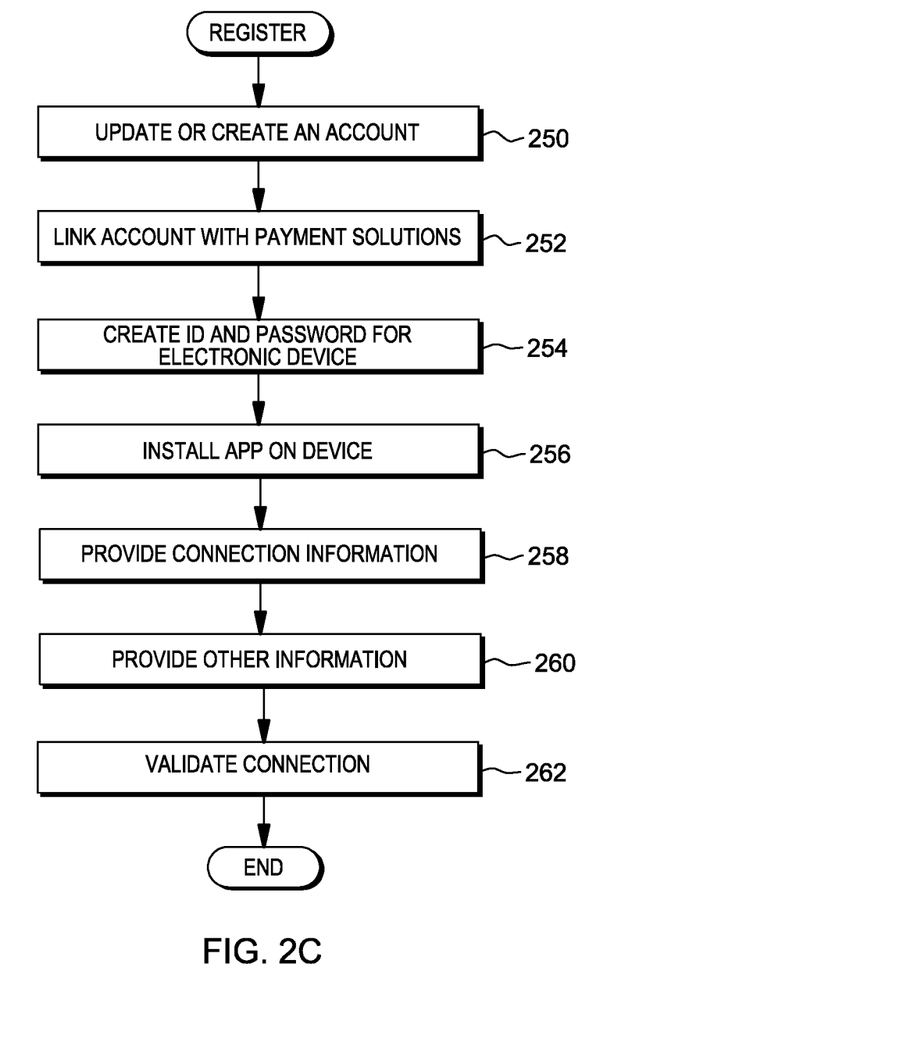
FIG. 2C depicts one embodiment of the logic to register an electronic device to use personalized fraud detection rules, in accordance with one or more aspects.

In one embodiment, referring to FIG. 2C, registration includes a number of steps. For instance, the user updates or creates an account with the financial institution (e.g., the bank issuing the credit card) indicating a desire to use personalized rules, STEP 250. This may include contacting the financial institution in-person, by phone or online via an electronic device. For instance, if the user already has an account with Bank X, then the user can communicate to Bank X that the user would like to use personalized rules on one or more of the user's electronic devices, in addition to the rules used by Bank X. The user also indicates to the financial institution which credit card(s), debit card(s), and/or payment service(s), etc. of the financial institution are to be included in the personalized rules fraud detection process, STEP 252.

Additionally, the user creates a remote id and password for the electronic device and provides this information, e.g., electronically, to the financial institution, in order to enable the electronic device to communicate with the financial institution, STEP 254.

The app is then installed on the electronic device, by, for instance, the user downloading the app from the financial institution onto the device, STEP 256. The app, subsequent to being installed on the device, is provided the connection information for the device and the financial institution, which may include certificates and/or encryption keys, STEP 258. This connection information includes, for instance, the server id, port id, URL (Uniform Resource Locator) address, etc.

Further, the user provides additional information to the electronic device, including, for instance, the account information, and the created id and password, to enable the electronic device and financial institution communicate, STEP 260. In particular, in one embodiment, the registration process includes providing information to the financial institution (e.g., a processor for the financial institution) and the electronic device in order to enable communication between the different entities. Moreover, the connection is validated, by for instance, running a test scenario in which the device and financial institution communicate, STEP 262. This completes registration. Thus, the personalized rules may be enabled on the electronic device. That is, the user has the ability to enable/disable each rule or a set of rules on the device in order to control when and/or which rules are to be used. Further, connections to data sources are provided by the user, including, for instance, providing any login and/or passwords to the data sources, e.g., Facebook, Twitter, or other types of sources, etc.

In one embodiment, more than one device is registered for a particular user. An app is installed on each device to be registered and each device is registered with the financial institution to receive notifications from the financial institution. Each registered device initially and periodically scans and prepares its connection to the data sources (e.g., calendar, address book, web history, social media, and smart device specific information) in order to obtain personalized information to be used in the fraud detection process, as depicted in FIG. 2A at STEP 200.

Continuing with FIG. 2A, at STEP E, rules and specialized custom tools (e.g., the code (e.g., SQL, graphical user interface (GUI), etc.) to process (e.g., create, delete, modify, manage) the rules) are developed and can be integrated with any network or data connected device (e.g., in cars, homes, etc.). These tools and/or the format or procedure to create personalized rules are included with the downloaded app. In one embodiment, the personalized rules are similar in format and manner of creation to the server-based rules used by the financial institution, and each financial institution may, in one embodiment, have its own format and/or creation mechanism. The user or a person on behalf of the user uses the provided tools and other information to, for instance, specify personalized rules for the user. The details of the personalized rules remain confidential, in one embodiment, to the user and/or selected persons associated with the user (e.g., a parent of a child user; a child of an elderly parent; a guardian, etc.), meaning that the financial institution is not provided or aware of the details of the rules. It simply knows that there are rules to be processed on the user's device. It knows this by an indicator (e.g., flag) associated with the user that is set and available to the financial institution (e.g., located in a database or other structure available to the financial institution or otherwise available to the institution).

Subsequent to performing registration and loading, a transaction request and response are performed, as described in one embodiment with reference to FIGS. 2A and 2B. Continuing with reference to FIG. 2A and with reference to FIG. 2B, initially, a financial transaction is initiated at a physical location, STEP 201. As examples, an in-store purchase, an ATM withdrawal, or a smart device transaction (e.g., transfer between individuals) is initiated. A request associated with the financial transaction is sent to a processing center, such as the financial institution that issued the credit card or holds the user's account, the merchant, or other processing center, for validation using the available processing techniques, STEP 202. This request includes, for instance, the vendor that is offering the item/service, the amount, the location, the item/service being purchased, and/or type of financial transaction (e.g., ATM withdrawal, credit card purchase, etc.). The processing center initiates its validation of the financial transaction including confirmation of available funds and server-based fraud detection, STEP 204. The rules associated with the validation are executed in real-time and/or near-real-time to evaluate the transaction based on standard, server-based rules (not personalized rules on one or more user electronic devices). These rules are used to capture wide-spread fraudulent activities. As used herein, real-time indicates that the validation is completed with the transaction (i.e., the result of the validation is provided in a timely manner and can be used to deny or approve the financial transaction). Near real-time indicates there was a delay (e.g., network delay or other delay, in, for instance, milliseconds, seconds, or other durations (e.g., minutes, hours, day(s), etc.), and thus, the results of validation are not used to approve/deny the financial transaction. However, the results are used, in one example, in post processing—e.g., a review process after the financial transaction is approved/ denied—to determine, for instance, if the account is to be flagged, the user is to be notified, and/or whether further investigation is to take place.

Additionally, in accordance with one aspect, these traditional rules are extended with the new personalized rules that are included on one or more electronic devices associated with the user. A rules database or other structure or processing used to store the traditional rules identifies whether the user is registered to use the private rules, such that one or more electronic devices are to be contacted to execute the evaluation. For instance, the rules database or other processing checks a flag associated with the user to determine if the user is registered for personalized rules. If the user is so registered, INQUIRY 206, then the processing center contacts one or more of the electronic devices registered for the user via, for instance, known electronic or communication mechanisms, STEP 210. Otherwise, only traditional fraud detection is used, STEP 208.

Assuming the indicator indicates the personalized rules are to be used, summary details of the financial transaction including, for instance, the dollar amount, location and/or description information, are sent in, for example, a request from the processing center to one or more of the electronic devices registered for the user, STEP 210. The more information that is provided about the financial transaction, the more specific the processing can be done by the personalized rules. The app on the electronic device receives the transaction details and evaluates, if desired (i.e., the user can decide to turn off this feature, as indicated above), the personalized rules in the electronic device based on the personalized information collected and/or available from the multiple sources and/or the transaction details, STEP 212. The results of evaluation of the rules are summarized and an indication of the transaction as being legitimate or fraudulent is sent from the electronic device to the processing center in, for instance, a response to the request via, for example, known electronic or communication mechanisms, STEP 214. This indication may be a simple flag or a probability score, as examples. The probability score indicates the probability that the transaction is fraudulent (e.g., there is a 20% chance that the transaction is fraudulent, etc.). In embodiments, the user (or a person on behalf of the user) can control the amount of information that is shared with the processing center to aid in further refinement of the process.

When the processing center receives the results from evaluation of the financial transaction based on the personalized rules and/or other information, the results are used in real-time and/or near-real-time processing to determine whether the financial transaction is to be approved or flagged for follow-up investigation. The results from each electronic device are evaluated along with the processing center's own confidence and together this new fraud probability or other indication is used to initiate the business process to confirm or deny the transaction, STEP 216. The confirmation or denial is sent to the requesting party (e.g., the vendor or ATM at which the financial transaction is initiated), and the transaction is completed, STEP 218.

In one embodiment, the user or a person on behalf of the user manages its configurations of the personalized rules, including what information is accessible and where it can be accessed, STEP 220. The user or person on behalf of the user can review the previous transactions or new rules recommended by the financial institution to better tune their own personal fraud detection rules. A user or person on behalf of the user can even create their own personal rules that would be unique to their own scenarios. Third party customizations can also be supported to allow linkage to more data sources and further intelligence in the evaluation of the rules.

In accordance with one or more aspects, additional processing of fraud prevention rules is offloaded to electronic devices of a user (e.g., controlled by or otherwise associated with the user). This allows the use of fraud prevention rules based upon private user data while addressing the user's concerns about entrusting such data to a third party. One or more aspects provide the following: protect the privacy of the customer, while allowing a financial institution or other processing center to continue to monitor and detect fraudulent activity; allow for extension and customization of fraud rules to be specific down to an individual level; provide flexibility and management of rules to satisfy the needs of the customer; allow the inclusion of multiple devices and additional individuals, such as members of a family; and/or do not require additional compute power or resources on the part of the processing center.

In accordance with one or more aspects, the following are addressed:

1. There is not enough compute power or ability at the present time for processing centers to create very specific fraud detection rules down to an individual and specific parameter. Reasons why this capability is not possible for the processing center are:

Evaluation of the rules would require the processing center (e.g., financial institution, such as a bank) to have access to significantly personal data (address books, calendars, etc.) requiring extensive security to encrypt the data and evaluate the rules in encrypted format (increasing processing loads);

Support for the constant updates would drive large loads because the business fraudulent rules would require constant feeds from email, Facebook, Twitter, and many other social networking sites for every credit card user;

User changes to calendaring or emails would require the user to manually reconfigure the server system (or even just updating passwords to access feeds from social sites); and Truly customized and dynamic rules would not be supportable, as "customer developed" evaluation criteria could not be managed and stored by the processing center due to the unlimited variables that could be incorporated.

2. The use of a personal electronic device allows for financial institutions to keep their current fraud detection model, yet address the constraints in #1. The evaluation of transactions (e.g., server-based and electronic device-based) is done in parallel, in one embodiment. The current (or future) processes that the processing centers wish to use can continue with only two very minor considerations. First, at the initiation of the fraud detection process, a message is sent to the personal device(s). This is not an impacting change to the process. Second, a monitoring process that receives the response from the personal device is used as one of many fraud inputs. If the response is instantaneous, the transaction could be denied or it could be used in post transaction processing, in which an indication or a recommendation of activity is provided. This is in addition to the current process, such that if this information is not received, the regular financial process continues as usual. This technique allows for the new personal rules to be added without impacting the current fraud processing.

In one embodiment, the monitoring process includes logic to determine how the fraud inputs are to be viewed. For instance, if a fraud input from a user's electronic device indicates the transaction is to be denied, then the process may include logic to deny the transaction. However, in another embodiment, the result from the user's device is weighted and a formula using all the weighted results is used to provide a final determination. Many possibilities exist, and each financial institution may have its own logic and its own way of handling the fraud indications from the user's electronic device(s).

3. It allows for customization or modification in real-time as the needs of the individual change. The focus would be for most rules to be evaluated in real-time without users needing to make changes. At anytime when the users want to customize a rule or change the feeds (e.g., use a new Twitter account or a new calendar), the rules can be updated at any time by updating the application and entering the appropriate password for authentication. Since these changes are performed on the electronic device, they are independent of the server (although the authentication could be server-based). Changing to a new smart device or adding an additional device to the account entails a connection to the processing center to download the app and registration.

4. It maintains privacy and provides control of personal information back to the end user/customer. There is no personal information provided to the processing center, so the user (or a person on behalf of the user . . . e.g., a parent for a child; a child for an elderly parent; a guardian; etc.) controls the personal information at all times. The processing center (e.g., bank, merchant, etc.) does not have access to the details and even the reason for an expected fraudulent transaction could be limited by the user. Users could choose to provide different levels of "fraud score" details to the processing center to help with the transaction evaluation. As examples, the following fraud score details could be provided:

Return only a percentage of fraud (0%=known to be legitimate; 30%=cannot confirm, but looks possible; 80%=likely a fraud; 100%=block transaction, known fraud).

Return a code or description along with the percentage (CC=confirmed based on calendar; DC=denied based on calendar/out of country; TS—trusted store used regularly; PB—personally blocked).

Return, with or without the percentage of fraud, detail of the rule in a text format for review in the post fraud review (e.g., 'airline travel booked from Toronto to Miami during time of transaction').

In one embodiment, focus is on the first view that returns only the percentage; it is also the one that allows the most automated view. However, for one implementation, it would be logical to have the app provide some sort of tracking detail, so if a transaction was accidentally approved or denied, there would be a possible review of "log details" that would be stored within the app.

5. It allows the end user/person on behalf of the user to customize and tailor monitoring in an on-demand model as needed. In #2, the message that is sent out to the smart device (or PC or other service) is transmitted to multiple end points. This allows the rules to be customized on each device. If you had the message sent to a child's smart device and the parent's—each device could apply different rules to the transaction for that credit card (in this example, assume it is the child's card (i.e., the child is the user) and the transaction is regarding a movie at the "Cineplex"):

Child's Smart Device: calendar and tweets confirm that the child has referenced the "Cineplex" so it is seen as a highly likely transaction;

Parent's Smart Device: parent grounded the child and set a list of "denied" stores;

Result: if the result was returned to the financial institution quickly, then the purchase is denied; otherwise, a post transaction alert is generated and the parent is notified.

Described in detail herein is a fraud detection capability that uses personalized rules and/or personal information located on or otherwise available to a user's electronic device to assist in evaluating whether a particular financial transaction should be approved.

In a further embodiment, if a registered electronic device is lost or if for some reason, the user no longer wants the rules followed, the processing center is contacted to remove the checking of personalized rules or to delete the registration of the device. For instance, the user or person on behalf of the user may log into its financial institution and remove the device from the user's list of approved rule processors (e.g., set or reset to a selected value an indicator associated with the device, e.g., in a data structure accessible to the user).

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 3:
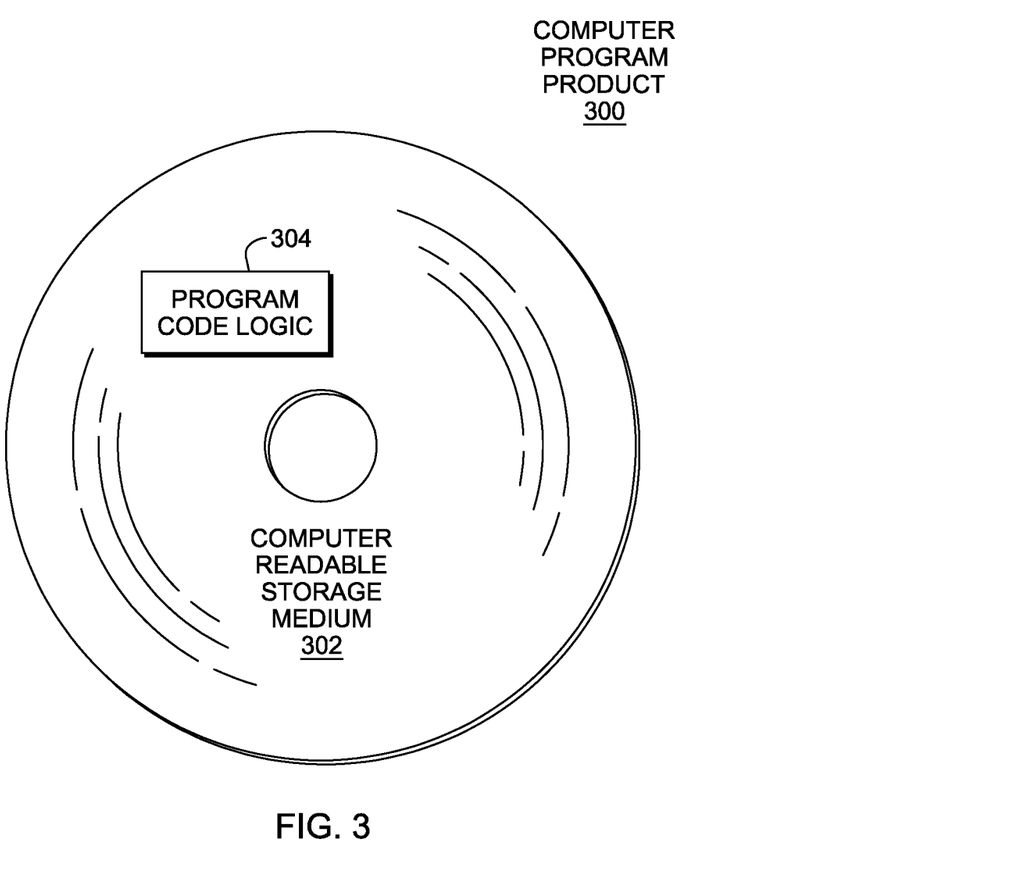
FIG. 3 depicts one embodiment of a computer program product incorporating one or more aspects.

Referring now to FIG. 3, in one example, a computer program product 300 includes, for instance, one or more non-transitory computer readable storage media 302 to store computer readable program code means or logic 304 thereon to provide and facilitate one or more aspects.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, other types of electronic devices may be used. Further, electronic devices of other architectures and/or using other operating systems may be used. Further, other types of processing centers may benefit from one or more aspects. Yet further, other types of personalized rules and/or personalized information may be used. Still further, other examples of users or those associated with users (other than, e.g., parent/child; child/elderly parent; guardian; etc.) are possible. Even further, in the embodiments described herein, the use of the personalized rules on the user's electronic device(s) is in addition to the server-based fraud detection processing; however, in a further embodiment, the server-based fraud detection processing is replaced by the personalized fraud detection processing on the user's electronic device(s). Many other types of variations are possible without departing from one or more aspects.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the one or more aspects in the form disclosed. Many modifications and variations will be apparent to those of ordinary skill in the art without departing from the scope and spirit of one or more aspects. The embodiment was chosen and described in order to best explain the principles of the one or more aspects and the practical application, and to enable others of ordinary skill in the art to understand the one or more aspects for various embodiments with various modifications as are suited to the particular use contemplated.

What is claimed is:

1. A method of facilitating fraud detection, said method comprising:

based on an initiated payment transaction to be remotely electronically authorized by at least one server of a payment transaction processing center, the at least one server being at least one computer system, obtaining from a request from the at least one server of the payment transaction processing center, by a personal electronic device of a user, the personal electronic device comprising a processor, information relating to the initiated payment transaction;

gathering, by the personal electronic device, personal data of the user accessible by the personal electronic device;

providing, by the personal electronic device, access to the personal data, the access being access by an application installed on the personal electronic device, for use in electronic approval determinations for payment transactions, wherein the access by the application to the personal data is controlled by privacy rules of the user and comprises the application tracking personalized information for the user, and wherein the personal data remains unknown to the at least one server of the payment transaction processing center;

evaluating, by the personal electronic device using the obtained information, a set of rules personalized for the user and available on the personal electronic device, the evaluating to determine whether the initiated payment transaction is to be electronically approved for the user, and the evaluating using the personal data accessible to the personal electronic device and to which the access is provided for determining whether the initiated payment transaction is to be electronically approved for the user, wherein the application monitors for an inquiry from the processing center, the inquiry comprising the information relating to the initiated payment transaction, and the application initiates the evaluating based on the monitoring, and wherein the evaluating compares at least some of the information relating to the initiated payment transaction to at least some of the personal data; and providing by the personal electronic device, based on the evaluating, and in response to the request by the at least one server of the payment transaction processing center, an initial indication of whether the initiated payment transaction is to be electronically approved.

2. The method of claim 1, wherein the at least one server is to determine whether the initiated payment transaction is to be electronically approved, and wherein the providing the initial indication of whether the initiated payment transaction is to be electronically approved provides the initial indication to the at least one server, the at least one server to use the initial indication to determine whether the initiated payment transaction is to be electronically approved.

3. The method of claim 2, further comprising:
using by the at least one server the initial indication to approve or deny the initiated payment transaction; and
providing by the at least one server approval or denial for the initiated payment transaction.

4. The method of claim 2, further comprising registering the personal electronic device with the processing center to enable the personal electronic device to receive the information.

5. The method of claim 1, wherein the initial indication comprises a probability score indicating a probability the initiated payment transaction is fraudulent.

6. The method of claim 1, wherein the set of rules is unknown to the at least one server, the at least one server to determine based on the initial indication whether the initiated payment transaction is to be electronically approved.

7. The method of claim 1, wherein the personal data is made available to the personal electronic device separate from the obtained information, and the personal data is automatically obtained by the personal electronic device.

8. The method of claim 1, wherein the personal electronic device is a device of a hierarchy of devices, the hierarchy comprising devices with which contact is attempted to be made in series until the initial indication is received, wherein contact with a next device in the series is attempted based on a previous device in the series being unavailable.

9. The method of claim 1, wherein the information relating to the initiated payment transaction includes one or more of an amount of the initiated payment transaction, a location of where the initiated payment transaction is initiated, type of payment transaction, vendor associated with the initiated payment transaction, or types of goods or services.

10. The method of claim 1, wherein the set of rules comprises one or more selected from the group consisting of: at least one personalized rule and personal information obtained by the personal electronic device.

11. The method of claim 1, wherein the personal electronic device of the user comprises a mobile computer device.

12. A computer program product for facilitating fraud detection, said computer program product comprising:
a non-transitory computer readable storage medium readable by a processing circuit and storing instructions for execution by the processing circuit for performing a method comprising:
based on an initiated payment transaction to be remotely electronically authorized by at least one server of a payment transaction processing center, the at least one server being at least one computer system, obtaining from a request from the at least one server of the payment transaction processing center, by a personal electronic device of a user, the personal electronic device comprising a processor, information relating to the initiated payment transaction;
gathering, by the personal electronic device, personal data of the user accessible by the personal electronic device;
providing, by the personal electronic device, access to the personal data, the access being access by an application installed on the personal electronic device, for use in electronic approval determinations for payment transactions, wherein the access by the application to the personal data is controlled by privacy rules of the user and comprises the application tracking personalized information for the user, and wherein the personal data remains unknown to the at least one server of the payment transaction processing center;
evaluating, by the personal electronic device using the obtained information, a set of rules personalized for the user and available on the personal electronic device, the evaluating to determine whether the initiated payment transaction is to be electronically approved for the user, and the evaluating using the personal data accessible to the personal electronic device and to which the access is provided for determining whether the initiated payment transaction is to be electronically approved for the user, wherein the application monitors for an inquiry from the processing center, the inquiry comprising the information relating to the initiated payment transaction, and the application initiates the evaluating based on the monitoring, and wherein the evaluating compares at least some of the information relating to the initiated payment transaction to at least some of the personal data; and
providing by the personal electronic device, based on the evaluating, and in response to the request by the at least one server of the payment transaction processing center, an initial indication of whether the initiated payment transaction is to be electronically approved.

13. The computer program product of claim 12, wherein the at least one server is to determine whether the initiated payment transaction is to be electronically approved, and wherein the providing the initial indication of whether the initiated payment transaction is to be electronically approved provides the initial indication to the at least one server, the at least one server to use the initial indication to determine whether the initiated payment transaction is to be electronically approved.

14. The computer program product of claim 12, wherein the initial indication comprises a probability score indicating a probability the initiated payment transaction is fraudulent.

15. The computer program product of claim 12, wherein the set of rules is unknown to the at least one server, the at least one server to determine based on the initial indication whether the initiated payment transaction is to be electronically approved.

16. The computer program product of claim 12, wherein the set of rules comprises one or more selected from the group consisting of: at least one personalized rule and personal information obtained by the personal electronic device.

17. A computer system for facilitating fraud detection, said computer system comprising:
a memory; and a processor in communications with the memory, wherein the computer system is configured to perform a method, said method comprising:
- based on an initiated payment transaction to be remotely electronically authorized by at least one server of a payment transaction processing center, the at least one server being at least one computer system, obtaining from a request from the at least one server of the payment transaction processing center, by a personal electronic device of a user, the personal electronic device comprising a processor, information relating to the initiated payment transaction;
- gathering, by the personal electronic device, personal data of the user accessible by the personal electronic device;
- providing, by the personal electronic device, access to the personal data, the access being access by an application installed on the personal electronic device, for use in electronic approval determinations for payment transactions, wherein the access by the application to the personal data is controlled by privacy rules of the user and comprises the application tracking personalized information for the user, and wherein the personal data remains unknown to the at least one server of the payment transaction processing center;
- evaluating, by the personal electronic device using the obtained information, a set of rules personalized for the user and available on the personal electronic device, the evaluating to determine whether the initiated payment transaction is to be electronically approved for the user, and the evaluating using the personal data accessible to the personal electronic device and to which the access is provided for determining whether the initiated payment transaction is to be electronically approved for the user, wherein the application monitors for an inquiry from the processing center, the inquiry comprising the information relating to the initiated payment transaction, and the application initiates the evaluating based on the monitoring, and wherein the evaluating compares at least some of the information relating to the initiated payment transaction to at least some of the personal data; and
- providing by the personal electronic device, based on the evaluating, and in response to the request by the at least one server of the payment transaction processing center, an initial indication of whether the initiated payment transaction is to be electronically approved.

18. The computer system of claim 17, wherein the at least one server is to determine whether the initiated payment transaction is to be electronically approved, and wherein the providing the initial indication of whether the initiated payment transaction is to be electronically approved provides the initial indication to the at least one server, the at least one server to use the initial indication to determine whether the initiated payment transaction is to be electronically approved.

19. The computer system of claim 17, wherein the obtaining the information relating to the initiated payment transaction comprises obtaining the information by a plurality of electronic devices, one or more of the plurality of electronic devices providing an initial indication to be used to determine whether the initiated payment transaction is to be electronically approved.

20. The computer system of claim 17, wherein the set of rules comprises one or more selected from the group consisting of: at least one personalized rule and personal information obtained by the personal electronic device.

* * * * *